United States Patent
Hansen

(10) Patent No.: US 8,870,461 B2
(45) Date of Patent: Oct. 28, 2014

(54) BEARING ASSEMBLY

(71) Applicant: Caterpillar Inc., Peoria, IL (US)

(72) Inventor: Matthew J. Hansen, Big Rock, IL (US)

(73) Assignee: Caterpiller Inc., Peoria, IL (US)

( * ) Notice: Subject to any disclaimer, the term of this patent is extended or adjusted under 35 U.S.C. 154(b) by 0 days.

(21) Appl. No.: 13/676,364

(22) Filed: Nov. 14, 2012

(65) Prior Publication Data

US 2014/0133948 A1    May 15, 2014

(51) Int. Cl.
| | |
|---|---|
| F16C 33/10 | (2006.01) |
| F16C 11/06 | (2006.01) |
| B66C 23/00 | (2006.01) |
| F16J 1/16 | (2006.01) |
| E02F 3/38 | (2006.01) |
| F16C 17/12 | (2006.01) |

(52) U.S. Cl.
CPC .. F16C 17/12 (2013.01); E02F 3/38 (2013.01)
USPC ........... 384/291; 384/295; 414/722; 403/158; 403/161

(58) Field of Classification Search
USPC .......... 384/291, 322, 372, 391; 403/158, 157, 403/161; 414/722, 723; 37/466, 468; 16/228, 340, 386, 381
See application file for complete search history.

(56) References Cited

U.S. PATENT DOCUMENTS

| | | | | |
|---|---|---|---|---|
| 2,625,448 | A | | 1/1953 | Underwood |
| 3,522,977 | A | * | 8/1970 | Lee et al. ...................... 384/322 |
| 3,917,422 | A | * | 11/1975 | Betzler ........................... 403/15 |
| 3,945,695 | A | | 3/1976 | Speakman |
| 4,096,957 | A | * | 6/1978 | Iverson et al. ................. 414/715 |
| 4,181,378 | A | * | 1/1980 | Schmaeng ..................... 384/147 |
| 4,251,182 | A | * | 2/1981 | Schroeder ..................... 414/723 |
| 4,576,488 | A | * | 3/1986 | Steiner et al. ................. 384/291 |
| 4,655,615 | A | | 4/1987 | Mori |
| 6,450,073 | B1 | * | 9/2002 | Boyer et al. .................... 82/129 |
| 6,666,581 | B1 | * | 12/2003 | Boyer ........................... 384/397 |
| 6,729,763 | B2 | * | 5/2004 | Post et al. ..................... 384/213 |
| 6,991,377 | B2 | | 1/2006 | Yamamoto et al. |
| 8,104,966 | B2 | | 1/2012 | Yamamoto et al. |
| 8,608,385 | B2 | * | 12/2013 | Ovares et al. ................. 384/288 |

* cited by examiner

*Primary Examiner* — Alan B Waits
(74) *Attorney, Agent, or Firm* — John Wappel

(57) ABSTRACT

A bushing for a bearing assembly is provided. The bushing includes a tubular sleeve having an inner surface and an outer surface. An inner circumferential channel is provided on the inner surface of the bushing. An outer channel is provided diagonally on the outer surface of the bushing and is configured to be in fluid communication with a lubricant supply path. Further, the bushing includes a port connecting the inner channel and the outer channel of the bushing.

12 Claims, 7 Drawing Sheets

BEARING ASSEMBLY

TECHNICAL FIELD

The present disclosure relates to a bearing assembly for a linkage member of a machine, and more particularly to a bushing for the bearing assembly.

BACKGROUND

Currently used lubrication systems include a bushing disposed within a housing. The lubrication system may be configured to direct a lubricant, such as grease, to an inner surface of the bushing. In a current design, a hole needs to be drilled through the housing in order to carry the grease to the center of the bushing. This drilling operation adds time and cost to the manufacturing process. Some of the current designs also include angled or helical grooves on an inner surface of the bushing. These grooves allow distribution of the grease over the surface of a bearing disposed within the bushing.

For example, U.S. Pat. No. 2,625,448 describes a bearing lubrication system wherein a bushing has spaced slots along the length of the bushing on its outer face and holes connecting the opposite ends of the slots with circumferentially formed oil grooves.

SUMMARY OF THE DISCLOSURE

In one aspect of the present disclosure, a bushing for a bearing assembly is provided. The bushing includes a tubular sleeve having an inner surface and an outer surface. An inner circumferential channel is provided on the inner surface of the bushing. An outer channel is provided diagonally on the outer surface of the bushing and is configured to be in fluid communication with a lubricant supply path. Further, the bushing includes a port connecting the inner channel and the outer channel of the bushing.

In another aspect, a bearing assembly is provided. The bearing assembly includes a bushing and a housing. The bushing includes a tubular sleeve and having an inner surface and an outer surface. An inner circumferential channel is provided on the inner surface of the bushing. An outer channel is provided diagonally on the outer surface of the bushing. Further, the bushing includes a port connecting the inner channel and the outer channel of the bushing. The housing includes an aperture and a lubricant supply path. The aperture is configured to receive the bushing. The outer channel of the bushing is configured to be in fluid communication with the lubricant supply path.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
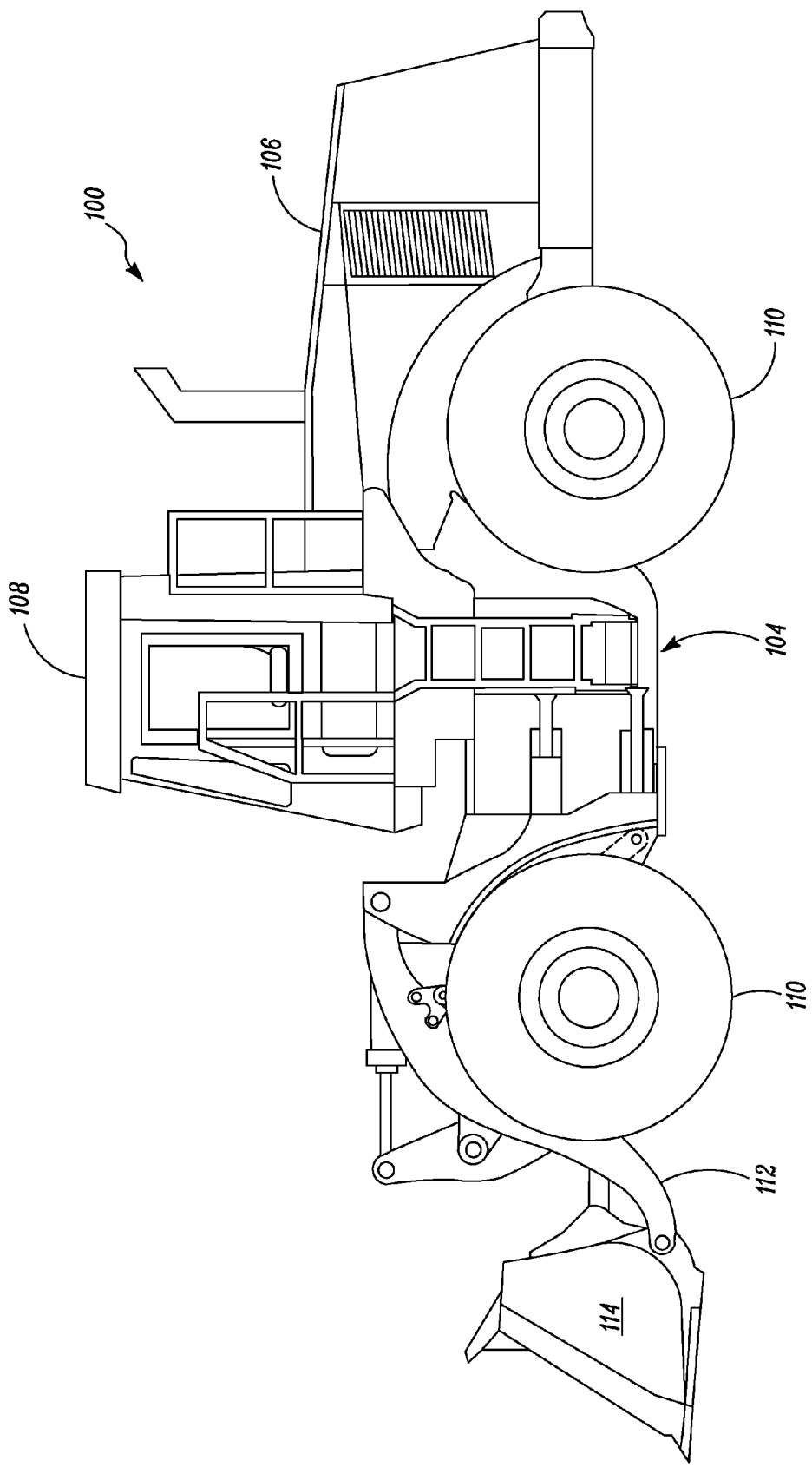
FIG. 1 is a diagrammatic view of an exemplary machine, according to one embodiment of the present disclosure.

FIG. 1 represents an exemplary machine 100, according to one embodiment of the present disclosure. More specifically, the machine 100 is a wheel loader as shown in the illustrated embodiment. It should be understood that the machine 100 may alternatively include other machines such as, a track loader, a tractor, an excavator, an earth mover or any other agricultural or construction machinery employing a bearing assembly.

Referring to FIG. 1, the machine 100 may include a chassis and/or a frame 104. A power source (not shown) is located within an engine enclosure 106 of the machine 100. The power source may include one or more engines, power plants or other power delivery systems like batteries, hybrid engines, and the like. It should be noted that power source could also be external to the machine 100. Further, the machine 100 includes an operator cabin 108 which houses controls for operating the machine 100. A set of ground engaging members 110, such as wheels, tracks, rollers, and the like are also provided on machine 100 for the purpose of mobility.

Figure 2:
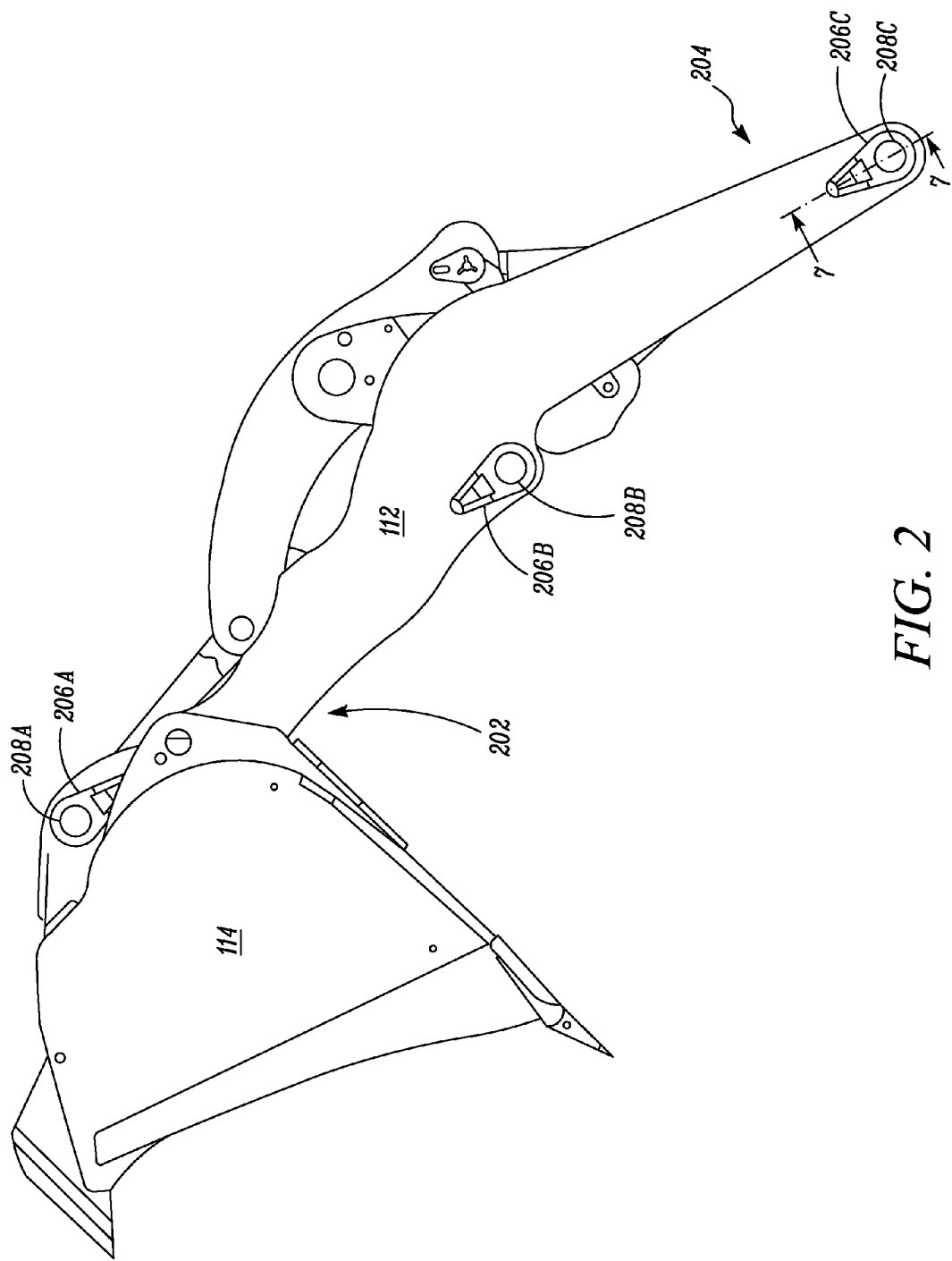
FIG. 2 is a side view of a lift arm along with a bucket.

As shown in FIG. 1, the machine 100 has a linkage assembly attached to the frame 104. The linkage assembly may include a structural member, such as, but not limited to, a lift arm 112. An implement, such as a bucket 114, is pivotally coupled to the lift arm 112. It may be noted that the structural member and the implement of the machine 100 may vary based on the type of machine. Moreover, the lift arm 112 and the bucket 114 may be moved to different positions during operation of the machine 100, in order to perform excavation and dumping tasks. The movement of the lift arm 112 and/or the bucket may be controlled by hydraulic cylinders (not shown in figures) which are coupled to these parts. FIG. 2 is an exploded view of the lift arm 112 and the bucket 114 of the machine 100, showing the lift arm 112 and the bucket 114 in a dump position.

As shown in FIG. 2, the lift arm 112 may include a first end 202 and a second end 204. The bucket 114 is pivotally coupled to the first end 202 of the lift arm 112. The second end 204 of the lift arm 112 is pivotally coupled to the frame 104 of the machine 100 (see FIG. 1). Also, the lift arm 112 may include a number of bearing assemblies 206A/B/C placed within respective bearing holes 208A/B/C in order to allow coupling to different components of the machine 100. For example, the bearing assembly 206A positioned within the bearing hole 208A may provide pivotal coupling between the bucket 114 and the lift arm 112. In another example, the bearing assembly 206C placed within the bearing hole 208C may facilitate coupling of the lift arm 112 to the frame 104. It should be noted that the placement and number of the bearing assemblies shown in the accompanying figures is merely on an exemplary basis and does not limit the scope of this disclosure.

Figure 3:
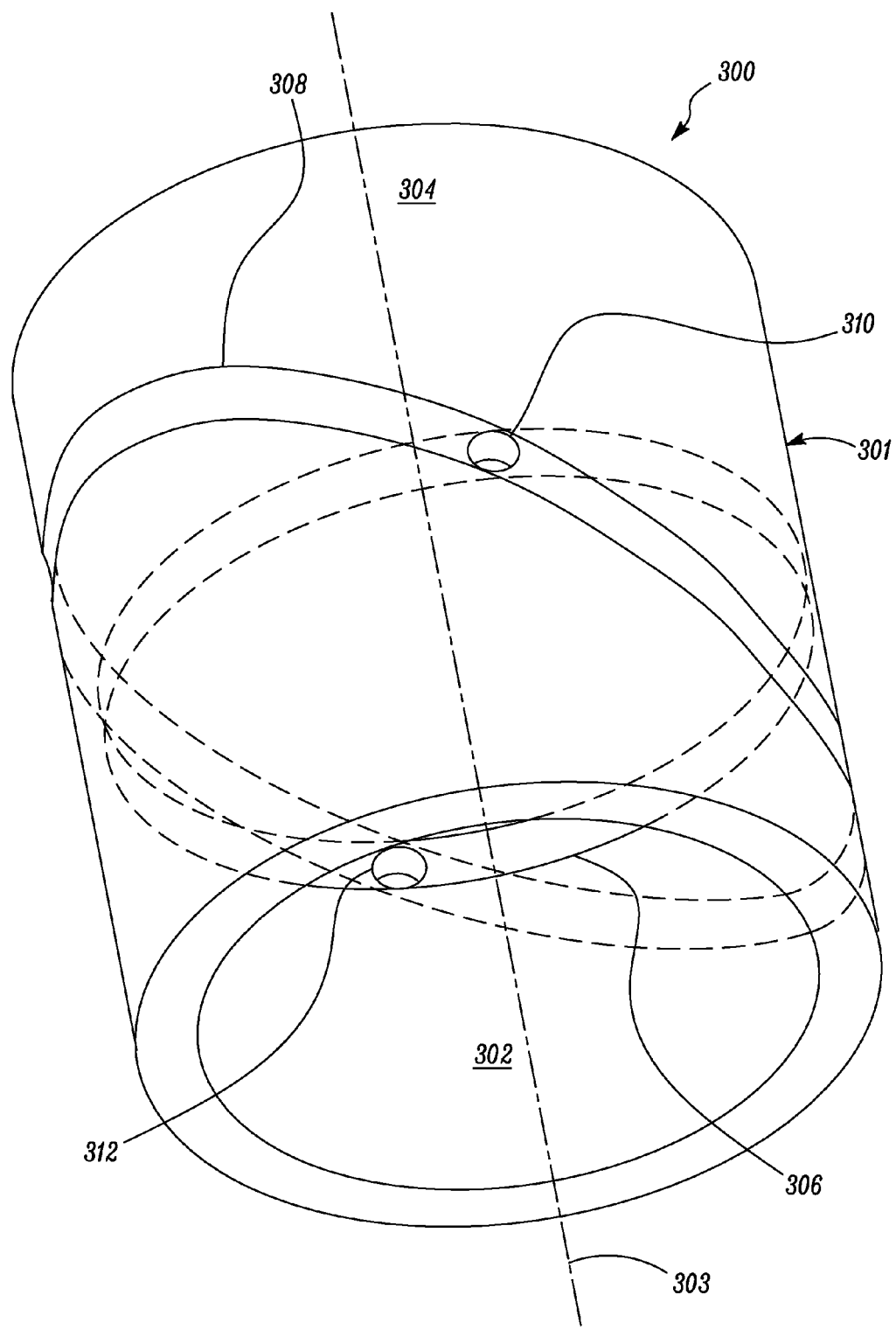
FIG. 3 is a perspective view of a bushing.

The present disclosure relates to a bushing 300 for at least one of the bearing assemblies 206A/B/C which is disposed in the respective bearing hole 208A/B/C. FIG. 3 depicts a perspective view of the bushing 300. As shown, the bushing 300 may include a hollow cylindrical body or tubular sleeve 301, which defines a longitudinal axis 303. One of ordinary skill in the art will appreciate that parameters like inner diameter, outer diameter, wall thickness, length, and the like may vary. Preferably, the bushing 300 is made of metal. Alternatively, the bushing 300 may be made of rubber, engineering plastics, polymers, and the like may be used according to design and requirements for a particular application.

As shown in the accompanying figures, the bushing 300 includes an inner surface 302 and an outer surface 304. Further, an inner channel 306 may be formed circumferentially on the inner surface 302. In one embodiment, the inner channel 306 may be placed equidistant from both ends of the bushing 300. As shown, the inner channel 306 may form a circular path on the inner surface 302 of the bushing 300. Further, an outer channel 308 may be provided diagonally about the outer surface 304 of the bushing 300. It should be understood that based on the length of the bushing 300, the outer channel 308 may form either a circular or an elliptical shaped path on the outer surface 304 of the tubular sleeve. Referring to FIG. 3, a first port 310 may be provided on the bushing 300 in order to provide fluid communication between the inner channel 306 and the outer channel 308.

In one embodiment, a similar second port 312 may be provided on the bushing 300, such that the second port 312 may also be in fluid communication with both the inner channel 306 and the outer channel 308. As shown, the second port 312 may be diametrically opposite to the first port 310. It should be understood that the location of the first port 310 and the second port 312 is so chosen, that the first and second ports 310, 312 when drilled or cut through the bushing 300, connect the inner channel 306 and the outer channel 308. It should be noted that additional circumferential channels not described herein may also be provided on the bushing 300.

Figure 4:
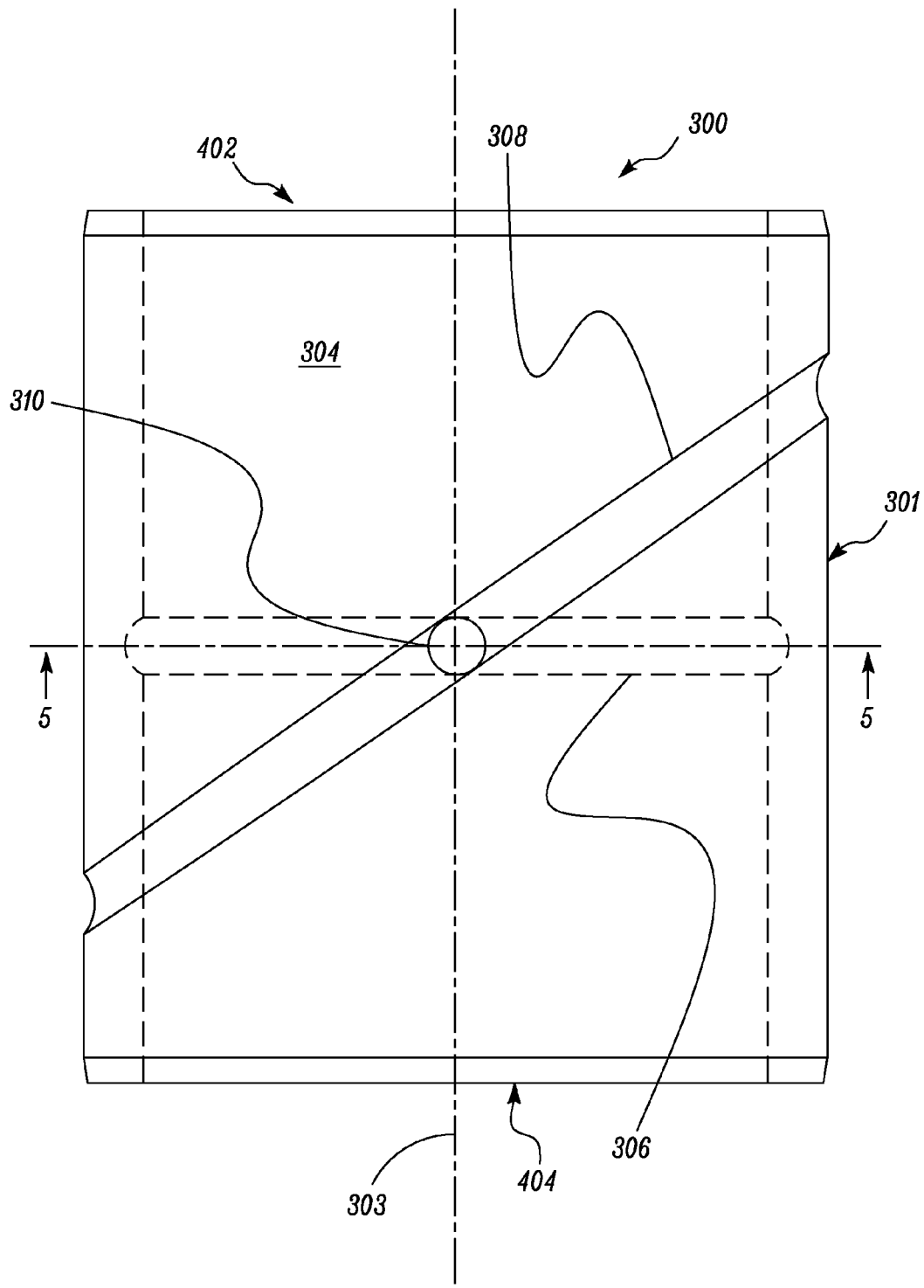
FIG. 4 is a side view of the bushing shown in FIG. 3.

FIG. 4 illustrates another view of the bushing 300 shown in FIG. 3. A first end 402 and a second end 404 are located along circumferentially opposing ends of the bushing 300. The first port 310 and/or the second port 312 may be placed at a variety of locations on the tubular sleeve 301. It should be noted that in case only a single port is provided, the port will be equidistant from the first and second ends 402, 404 of the bushing 300 due to the circular cross section.

Figure 5:
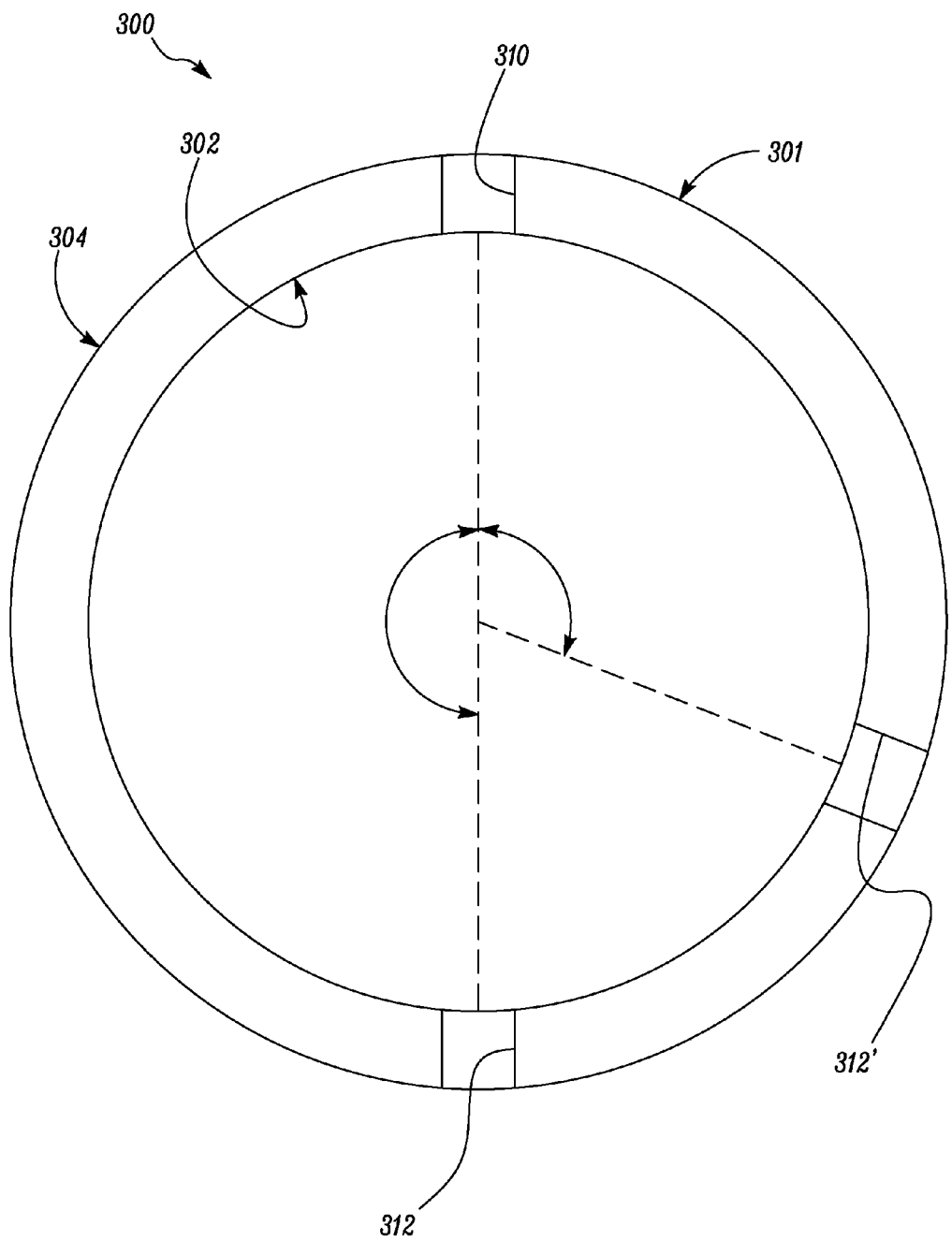
FIG. 5 is a sectional view of the bushing shown in FIG. 4 along plane 5-5.

FIG. 3 illustrates an exemplary embodiment wherein the first port 310 and the second port 312 are located at diametrically opposite sides of bushing 300. FIG. 5 depicts a sectional view of the bushing 300 taken along plane 5-5 as shown in FIG. 4. In the exemplary embodiment, the second port 312 may be located diametrically opposite (180 degrees) from the first port 310. Alternatively, the second port 312' may be positioned at a radially offset location within the tubular sleeve 301. A person of ordinary skill in the art will appreciate that the placement of the ports, number of ports, and the like may vary for different configurations of the inner channel 306 and the outer channel 308, so long as fluid communication is provided between the inner channel 306 and the outer channel 308.

Figure 6:
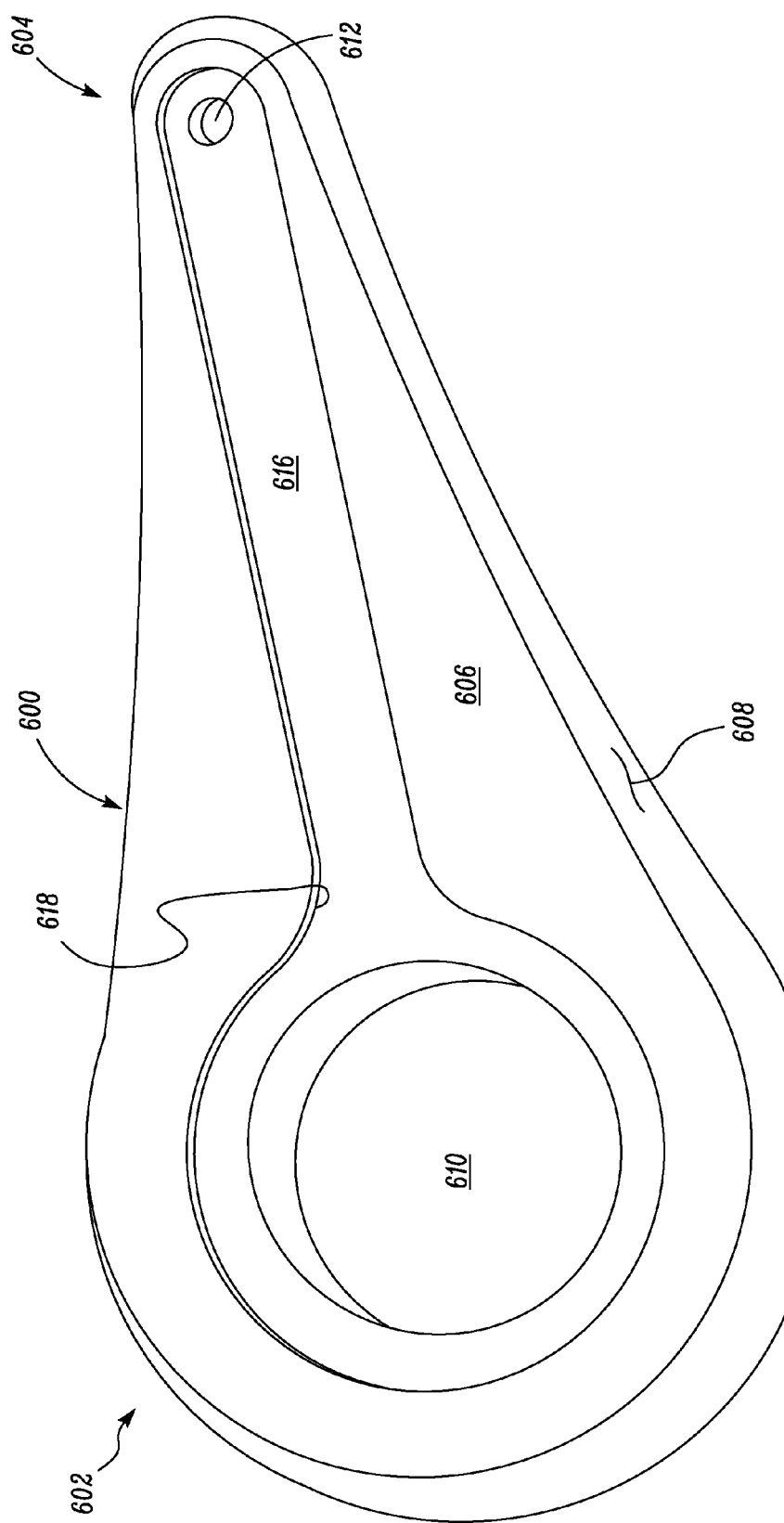
FIG. 6 is a perspective view of a housing.

In the present disclosure, the bushing 300 may be disposed within a housing 600 shown in FIG. 6. The housing 600 may be part of the bearing assembly 206A/B/C (see FIG. 2). As shown in FIG. 6, the housing 600 may include a longitudinally formed element having a first end 602 and a second end 604. The housing 600 may also include a major surface 606 and a side surface 608. Further, an aperture 610 may be formed proximate to the first end 602 of the housing 600 and a bore 612 may be formed proximate to the second end 604 of the housing 600. The aperture 610 may be configured to receive the bushing 300 and the bore 612 may be configured to receive a grease fitting. The detailed explanation of this arrangement will be explained in connection with FIG. 7.

Referring to FIG. 6, a depressed surface 616 may be provided on the major surface 606 of the housing 600. The depressed surface 616 may be defined by a sidewall 618. Parameters related to the housing 600 such as, length, thickness, other shape and dimension related specifics, and the like may vary. It should be noted that the dimensions of the housing 600 and the configurations formed thereon may be based on the system design and requirements for a particular application.

Figure 7:
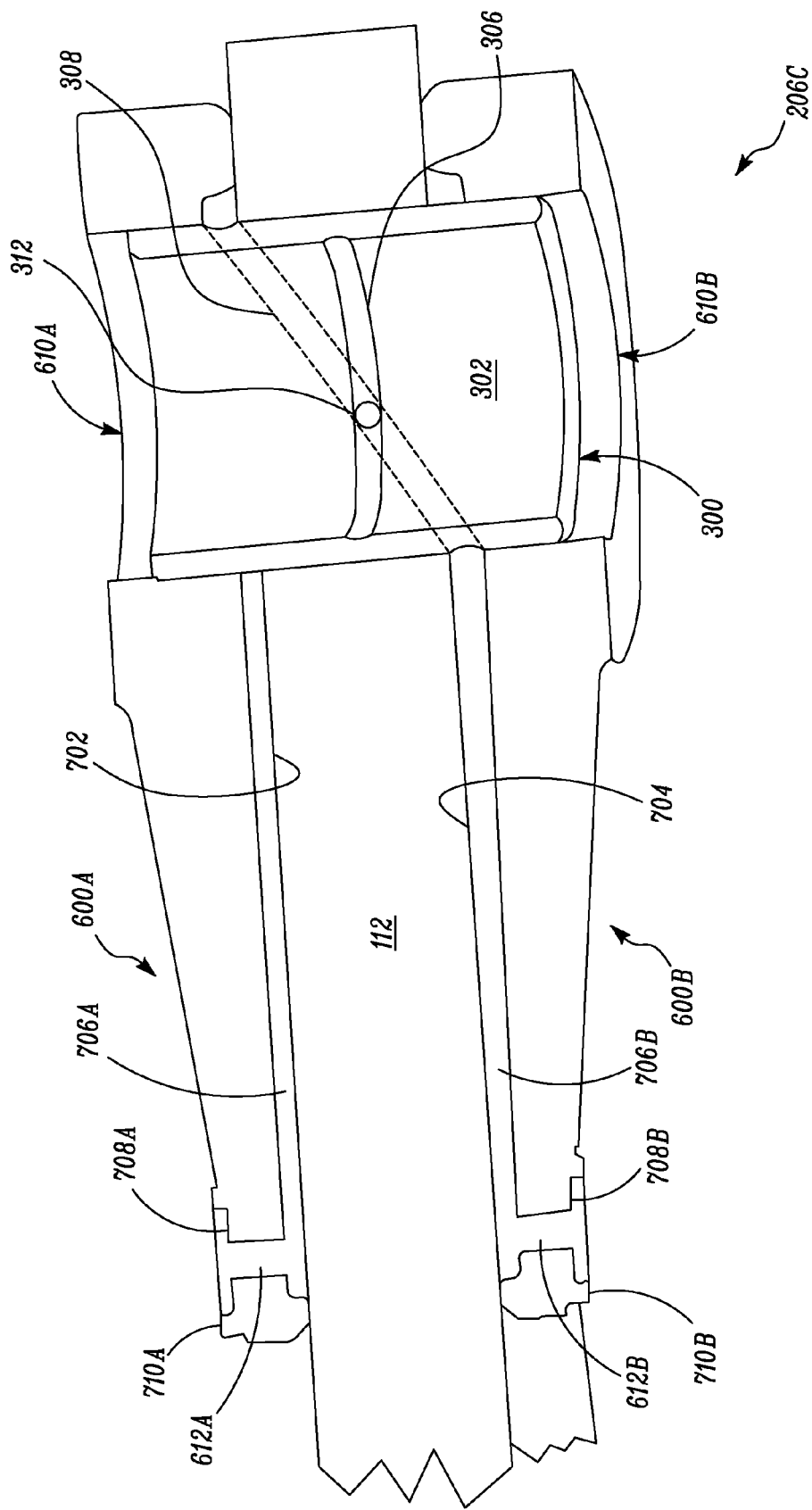
FIG. 7 is a sectional view of a bearing assembly along the plane 7-7 shown in FIG. 2.

FIG. 7 illustrates a sectional view of the bearing assembly 206C along the plane 7-7 shown in FIG. 2. As shown in the accompanying drawings, the housing 600 may be attached to the lift arm 112 such that a first housing member 600A is in contact with a first face 702 of the lift arm 112. Further, in the illustrated embodiment, a second housing member 600B may be attached to a second face 704 of the lift arm 112. In one embodiment, the first and/or second housing members 600A, 600B may be attached to the lift arm 112 by welding. Alternatively, any other method known in art may be used to join the housing 600 to the lift arm 112.

It should be noted that the design and construction of the first and second housing members 600A, 600B is the same as that described in connection with the housing 600 shown in FIG. 6. Hence, the first housing member 600A may include a first aperture 610A and a first bore 612A. Similarly, the second housing member 600B may include a second aperture 610B and a second bore 612B. In one embodiment, as illustrated, the bushing 300 may be inserted into the first and second apertures 610A, 610B through the lift arm 112.

Further, a first conduit 706A and a second conduit 706B proximate to the first and second faces 702, 704 respectively of the lift arm 112 may be formed adjacent to the bushing 300. It should be noted that the first and/or second conduits 706A, 706B are defined by the depressed surface 616 and the sidewall 618 provided on the housing 600 and the first and second faces 702, 704 of the lift arm 112. As shown in FIG. 7, one end of the first and second conduits 706A, 706B is in fluid communication with bores 612A, 612B respectively. The bores 612A, 612B may extend into flat surfaces 708A, 708B which are defined by first and second bosses 710A, 710B respectively. The first and second bosses 710A, 710B may be in cooperation with the grease fittings.

Grease or any other lubricating material may be supplied to the first and/or second conduits 706A, 706B via the bores 612A, 612B respectively. In one embodiment, the grease is supplied through a grease fitting (not shown). Alternatively, the grease may be supplied manually. The first and second conduits 706A, 706B may form lubrication supply paths within the first and second housing members 600A, 600B for delivery of the grease to the bushing 300.

More specifically, the bushing 300 may be disposed within the aperture 610 of the housing 600 in such a manner so that a portion of the outer channel 308 is in fluid communication with the first conduit 706A, while another portion of the outer channel 308 is in fluid communication with the second conduit 706B. This arrangement may be maintained in any rotational orientation of the bushing 300 within the aperture 610 of the housing 600.

The grease may enter into the housing 600 via the bores 612A, 612B. Subsequently, the grease may flow into the lubrication supply paths formed by the first and second conduits 706A, 706B which are in fluid communication with the bores 612A, 612B. Further, the grease may be provided by the lubrication supply paths to the outer channel 308 of the bushing 300 and then distributed to the inner channel 306 via the first and second ports 310, 312. In one embodiment, the grease may continue to flow into a bearing or any other similar component (not shown) disposed inside the inner surface 302 of the bushing 300.

INDUSTRIAL APPLICABILITY

Current lubrication systems require a hole to be drilled within a housing in order to guide the grease received via a grease port to the center of the bushing. This drilling operation adds time and cost to the manufacturing process. More specifically, in this situation the grease port is required to be further away from the joint than usual.

In the present disclosure, the grease or other lubricating material is allowed to flow through the bores 612A, 612B of the housing 600 and into the conduits 706A, 706B. The conduits 706A, 706B are in fluid communication with the diagonal outer channel 308 of the bushing 300 disposed inside the housing 600. Further, the grease may flow into the inner channel 306 of the bushing 300 through the first port 310 and the second port 312. In one embodiment, the grease may then be supplied to a pin or other shaft (not shown) disposed inside the bushing 300.

To this end, the present disclosure may provide grease to the bushing 300 while eliminating the need to drill additional holes through the housing 600 and/or the lift arm 112. Hence, the disclosed design may save considerable time and cost required for the manufacturing process. Moreover, elimination of the drilling may further help to avoid chances of machining chips or burr produced by drilling operations. Accordingly, the bearing assembly 206A/B/C may remain clean of machining waste and free from choking.

A person of ordinary skill in the art will appreciate that all manufacturing operations for supply of the grease in the present disclosure are moved to the piece parts. Also, the disclosed features may be added to existing machine parts with reduced or minimal costs. It should be noted that the present disclosure can be used on any pin joint which has a greased bushing and a boss that is welded around its perimeter and is not limited to the application described herein.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A bearing assembly for cooperation with a structural member comprising:
    a bushing including:
        a tubular sleeve having an inner surface and an outer surface;
        an inner channel provided circumferentially about the inner surface of the tubular sleeve;
        an outer channel provided diagonally about the outer surface of the tubular sleeve; and
        a first port connecting the inner channel and outer channel; and
    a first housing including:
        a first aperture configured to receive the bushing; and
        a first lubricant supply path including a first conduit disposed about the first aperture and extending away from the first aperture, the first conduit defined by a first depressed surface disposed in the first housing, a first sidewall surrounding the first depressed surface, and a first face of the structural member;
        wherein the outer channel is configured for fluid communication with the first lubricant supply path.

2. The bearing assembly of claim 1, wherein the bearing assembly further includes a second housing including:
    a second aperture configured to receive the bushing; and
    a second lubricant supply path including a second conduit disposed about the second aperture and extending away from the second aperture, the second conduit defined by a second depressed surface disposed in the second housing, a second sidewall surrounding the first depressed surface, and a second face of the structural member.

3. The bearing assembly of claim 2, wherein one of the first conduit and the second conduit is in fluid communication with the outer channel.

4. The bearing assembly of claim 2, wherein both the first conduit and the second conduit are in fluid communication with the outer channel.

5. The bearing assembly of claim 2, wherein the first housing further includes a first boss having a flat surface and a bore, the bore being in fluid communication with the first conduit, wherein the first boss is configured for cooperation with a grease fitting.

6. The bearing assembly of claim 5, wherein the second housing further includes a second boss having a flat surface and a bore, the bore being in fluid communication with the second conduit, wherein the second boss is configured for cooperation with a grease fitting.

7. The bearing assembly of claim 1, wherein the first housing further includes a first boss having a flat surface and a bore, the bore being in fluid communication with the first conduit, wherein the first boss is configured for cooperation with a grease fitting.

8. A machine comprising:
    a frame;
    a linkage assembly connected to the frame, the linkage assembly including a structural member; and
    a bearing assembly attached to the structural member, the bearing assembly comprising:
        a bushing including:
            a tubular sleeve having an inner surface and an outer surface;
            an inner channel provided circumferentially about the inner surface of the tubular sleeve;
            an outer channel provided diagonally about the outer surface of the tubular sleeve; and
            a first port connecting the inner channel and outer channel; and
        a housing including a first housing member attached to a first face of the structural member and a second housing member attached to a second face of the structural member, wherein each of the first housing member and the second housing member includes:
            an aperture configured to receive the bushing; and
            a conduit disposed about the aperture and extending away from the aperture, the conduit defined by a depressed surface disposed in one of the first housing member and the second housing member, a sidewall surrounding the depressed surface, and a face of the structural member;
        wherein the outer channel is configured for fluid communication with the conduit.

9. The machine of claim 8, wherein the first housing member and the second housing member are welded to opposing faces of the structural member.

10. The machine of claim 8, wherein each of the first housing member and the second housing member includes a boss having a flat surface and a bore, the bore being in fluid communication with the conduit.

11. The machine of claim 10, wherein the boss of at least one of the first housing member and the second housing member is configured for cooperation with a grease fitting.

12. The machine of claim 8, wherein each of the first housing member and the second housing member are constructed of cast metal.

* * * * *